(12) United States Patent
Wieneke

(10) Patent No.: US 9,939,257 B2
(45) Date of Patent: Apr. 10, 2018

(54) METHOD FOR DETERMINING A SPATIAL DISPLACEMENT VECTOR FIELD

(71) Applicant: LaVision GmbH, Goettingen (DE)

(72) Inventor: Bernhard Wieneke, Goettingen (DE)

(73) Assignee: LaVision GmbH (DE)

( * ) Notice: Subject to any disclaimer, the term of this patent is extended or adjusted under 35 U.S.C. 154(b) by 0 days.

(21) Appl. No.: 15/308,245

(22) PCT Filed: Jun. 17, 2015

(86) PCT No.: PCT/EP2015/063614
§ 371 (c)(1),
(2) Date: Nov. 1, 2016

(87) PCT Pub. No.: WO2015/193383
PCT Pub. Date: Dec. 23, 2015

(65) Prior Publication Data
US 2017/0059307 A1 Mar. 2, 2017

(30) Foreign Application Priority Data

Jun. 19, 2014 (DE) .......................... 10 2014 108 643

(51) Int. Cl.
*G06K 9/00* (2006.01)
*G01B 11/25* (2006.01)
(Continued)

(52) U.S. Cl.
CPC ........ *G01B 11/2513* (2013.01); *G01B 11/167* (2013.01); *G06T 7/0002* (2013.01);
(Continued)

(58) Field of Classification Search
CPC ............... G01N 15/14; G01N 21/9501; G01N 2021/95615; G01N 15/1463
(Continued)

(56) References Cited

U.S. PATENT DOCUMENTS 4,967,093 A 10/1990 Takemori
7,275,006 B2 * 9/2007 Tsuji ................ G01N 21/95607
702/81
(Continued)

FOREIGN PATENT DOCUMENTS

DE 195 09 962 9/1996

OTHER PUBLICATIONS

International Search Report dated Sep. 25, 2015.
(Continued)

*Primary Examiner* — Yosef Kassa
(74) *Attorney, Agent, or Firm* — Gerald E. Hespos; Michael J. Porco; Matthew T. Hespos

(57) ABSTRACT

An inherent pattern image (100, 100F) of a test object (10) is recorded when the test object is illuminated with uniform illumination light, and a projection pattern image (200, 200F) is recorded when the test object is illuminated with a spatially modulated projection pattern. A planar displacement vector field (110, 110F) is calculated from the inherent pattern image, and a shape (210, 210F) is calculated from the projection pattern image. An image of the first type is recorded at time ($t_T$), and images of the second type are recorded at times ($t_{T-}$; $t_{T+}$) before and after the time ($t_T$). A representation of the test object at the test time ($t_T$) is estimated by averaging. A spatial displacement vector field (300) is based on the calculated representation of the test object of the first image type and the representation of the test object estimated from the images of the second type.

9 Claims, 3 Drawing Sheets

(51) Int. Cl.
*G01B 11/16* (2006.01)
*G06T 7/521* (2017.01)
*G06T 7/223* (2017.01)
*G06T 7/00* (2017.01)
*G06T 7/60* (2017.01)

(52) U.S. Cl.
CPC .............. *G06T 7/223* (2017.01); *G06T 7/521* (2017.01); *G06T 7/60* (2013.01); *G06T 2207/10028* (2013.01); *G06T 2207/30164* (2013.01)

(58) Field of Classification Search
USPC ..... 382/103, 107, 141, 151, 154; 348/86, 95
See application file for complete search history.

(56) References Cited

U.S. PATENT DOCUMENTS

| | | | | |
|---|---|---|---|---|
| 7,391,515 B2* | 6/2008 | Budd | ................ | G01N 15/042 356/335 |
| 7,495,456 B2* | 2/2009 | Horii | ................ | G01R 31/2601 257/200 |
| 7,643,668 B2* | 1/2010 | Nakatani | ................ | G03F 1/84 382/149 |
| 7,656,516 B2* | 2/2010 | Imai | ................ | G01N 21/9501 356/237.1 |
| 8,289,440 B2* | 10/2012 | Knight | ................ | H04N 5/23212 348/222.1 |
| 8,400,555 B1* | 3/2013 | Georgiev | ................ | H04N 5/23212 348/222.1 |

OTHER PUBLICATIONS

Sutton M. et al.—"Application of an optimized digital correlation method to planar deformation analysis", Image and Vision Computing, Elsevier, Guildford, GB, vol. 4, No. 3, Aug. 1, 1996, pp. 143-150.

Chen Und F P Chiang D J—"Optimal sampling and range of measurement in displacement only laser speckle correlation", Experimental Mechanics, Springer New York LLC, US, vol. 32, Jan. 1, 1992, pp. 145-153.

International Preliminary Report on Patentability for International Application No. PCT/EP2015/063614 dated Dec. 20, 2016.

* cited by examiner

METHOD FOR DETERMINING A SPATIAL DISPLACEMENT VECTOR FIELD

BACKGROUND

1. Field of the Invention

The invention relates to a method for determining a spatial displacement vector field of a test object, in which two types of image are recorded of the test object, specifically
- at least one inherent pattern image recorded when the test object is illuminated with uniform illumination light, and
- at least one projection pattern image, recorded when the test object is illuminated with a spatially modulated projection pattern projected onto said test object, wherein
- a planar displacement vector field of the test object is calculated from the inherent pattern image at the time when the inherent pattern image is recorded as a representation of the test object assigned to the inherent pattern image and
- a shape of the test object is calculated from the projection pattern image at the time when the projection pattern image is recorded as a representation of the test object assigned to the projection pattern image, and wherein the spatial displacement vector field is determined from the representations of the test object which are assigned to the recorded images.

2. Description of the Related Art

Methods for determining a spatial displacement vector field of a test object are known from DE 195 09 962 A1.

A frequent problem that occurs during material testing, for example, is the determination of the three-dimensional deformation of a test object subjected to mechanical stress. In this context, a spatial displacement vector field is sought. The spatial displacement vector field assigns (within the limits of resolution of the measurement) a three-dimensional vector to each (visible) surface point of the test object. Each vector represents the displacement of the surface point at the time of measurement relative to a reference condition of the test object at a different time. Here, this spatial displacement vector field will synonymously also be termed 3D deformation.

The 3-D deformation normally is determined using a method referred to as stereo-DIC (digital image correlation) utilizing two cameras, the images of which are correlated with one another.

Methods are also known, however, that require merely one camera. For example, the method disclosed in the above-mentioned patent specification provides for recording two types of images of the test object using merely one camera. In particular, a so-called inherent pattern image is recorded, for which the test object is essentially illuminated uniformly, so that any preferably random structure present on its surface is discernible. This can be a natural surface structure of the test object, a structure that is artificially applied, such as randomly distributed ink droplets, or similar. By comparing the inherent pattern image at a given recording time with an inherent pattern image recorded at a given reference time, a two-dimensional vector can be determined for each visible surface point on the two-dimensional image of the test object, which represents the two-dimensional displacement of the surface point in the image between the reference state and the state of the test object at the time when the inherent image was recorded. This planar spatial displacement vector field will also be designated here as synonymous with 2-D deformation. For this reason, inherent pattern image and 2-D deformation are correlated with one another insofar that the 2-D deformation can be calculated from the inherent pattern image. Therefore, the planar displacement vector field, i.e. the 2-D deformation, is designated here as the representation of the test object assigned to the inherent pattern image.

Furthermore, it is known to record a so-called projection image pattern of the test object, which is characterized in that, when it is recorded, the test object is illuminated with a known projection pattern. The projection pattern is preferably a periodic, spatial identity modulation of the illumination light. A bar pattern, grid pattern or wave pattern can be projected onto the test object, for example, wherein sharp edges or continuous transitions can be realized between light and dark areas of the pattern. If the projection pattern as such is known, the three-dimensional shape of the test object can be deduced from the distortion of the pattern in the projection pattern image at the time when the projection pattern image is recorded. By comparing this shape of the test object with its shape at a given reference time, the change in shape of the test object between the reference time and the time of recording the projection pattern image can be deduced. The projection pattern image and the shape of the test object are therefore correlated to the extent that the shape of the test object can be calculated from the projection pattern image. The shape of the test object is therefore also designated here as the representation of the test object assigned to the projection pattern image.

To determine the 3-D deformation, it is further known to combine the 2-D deformation discussed above and the shape or change in shape of the test object. To determine the spatial displacement vector field, the planar displacement vector field and the three-dimensional shape or change in shape of the test object are therefore combined. The required or possible mathematical calculation rules for this are known to a person skilled in the art and are therefore of no further importance for the present invention.

A problem with the known methods outlined above is that the inherent image and the projection pattern image must typically be recorded at different times. The determination of the 3-D deformation is thus based on the representative 3-D deformation at the time when the inherent pattern image is recorded and on the representative shape of the test object at the (different) time when the projection pattern image is recorded. The 2-D deformation determined is therefore not representative for a specific time, but rather for the time interval between the two recording times of the inherent pattern image and the projection pattern image, with the corresponding loss of measurement precision. In the case of fast-occurring processes in the test object, for example crack or fissure processes, this reduces the informational value of the measurement significantly.

From the above mentioned generic patent specification it is known to record the inherent pattern image and projection pattern image simultaneously, with the test object being simultaneously illuminated with a uniform and a spatially modulated illumination light in different spectral ranges. The separation of the "pure" inherent pattern images and projection pattern images then is carried out by spectral post-processing of the recordings. Even a separation of the "pure" images by spatial frequency filtration in the recordings is conceivable. This results in significant extra effort and expense, however, both with regard to the experimental set up as well as with regard to the computational post-processing.

The task of the present invention is to provide a generic method for determining the 3-D deformation of a test object, which permits a precise chronological assignment at reduced cost.

SUMMARY

This task is solved by a method that includes:
- recording at least one inherent pattern image while illuminating the test object (10) with uniform illumination light,
- recording at least one projection pattern image while illuminating the test object with a spatially modulated projection pattern projected onto the test object,
- calculating a planar displacement vector field of the test object from the inherent pattern image when the inherent pattern image is recorded as a representation of the test object assigned to the inherent pattern image,
- calculating a shape of the test object from the projection pattern image when the projection pattern image is recorded as a representation of the test object assigned to the projection pattern image,
- recording an image of a first of the two types of images at a test time, and recording images of the second of the two types of images at two different recording times, before and after the test time,
- estimating the corresponding representation of the test object at the test time by averaging from the calculated representations of the test object assigned to the images of the second type of image, and
- determining the spatial displacement vector field based on the calculated representation of the test object assigned to the image of the first image type, as well as on the representation of the test object estimated from the images of the second type of image.

According to the invention, instead of only two images at least 3 images are recorded, specifically one inherent pattern image and two projection pattern images or one projection pattern image and two inherent pattern images, wherein the type of image recorded merely singly is flanked chronologically by the twice recorded type of image. Therefore, if an inherent pattern image is recorded at a given test time, a projection pattern image is recorded in each case shortly before and shortly after the test time. Conversely, if a projection pattern image is recorded at the test time, one inherent pattern image is recorded in each case shortly before and shortly after the test time. Generally speaking, therefore, the image of the first type of image recorded at the test time is flanked chronologically by two recordings of one image each of the second type of image. Then, in each case the assigned representation of the test object is calculated from the flanking images of the second type of image. If the flanking images of the second type of image are projection pattern images, the representative shape of the test object is calculated from each of them for the respective time of recording of the projection pattern image. If the flanking images of the second type of image are inherent pattern images, however, the 2-D deformation representative for the respective time of recording of the inherent pattern image is calculated from each of them. The respectively necessary three images can be recorded separately, for example, or they can be selected from a series of many recorded images of alternating types of image. The latter variant has the advantage that close to a time of interest multiple image triplets of different composition (inherent/projection/inherent image or projection/inherent/projection image) are available.

In a next step, the calculated representations are averaged together. This can in particular involve arithmetic averaging, although also other mean value calculations can in principle be used. Therefore, from two shapes of the test object at the recording times of two flanking projection pattern images one mean shape of the test object is averaged, which can be considered representative for a time that is situated between the two recording times, and in particular representative for the time of testing. From two 2-D deformations of the test object at the recording times of two flanking inherent pattern images, however, one mean 2-D deformation is averaged, which is representative for a time between the two recording times, and in particular representative for the time of testing. Generally speaking, therefore, the representation of the test object required for determining the 3-D deformation, for which no image of the assigned type of image was recorded at the time of testing, is estimated by averaging.

In a further step, which can also be performed before or parallel to the previously discussed step, the representation of the test object assigned to the image recorded at the time of testing is calculated. If an inherent pattern image was recorded at the time of testing, the 2-D deformation representative for the test time is calculated; however, if a projection pattern image was recorded at the time of testing, the shape of the test object representative for the time of testing is calculated.

Therefore, the representation calculated from the image recorded directly at the time of testing and the representation estimated from the flanking images via the detour of averaging are available as the representations representing the test object at the time of testing. From these two representations, i.e. the calculated and the estimated representation, the 3-D deformation of the test object then is determined in the customary manner. Instead of using representations of the test object directly calculated from images recorded at different times, or representations of the test object calculated directly from simultaneously recorded and expensively separated images, according to the invention the determination of the 3-D deformation is based on one calculated and one estimated representation.

The invention permits the 3-D deformation to be determined for an exactly determined time of testing, without great expenditure in terms of equipment and computations for the extraction of "pure" inherent pattern images and projection pattern images from superimposed images recorded at the time of testing.

Preferred are the recording times of images of the second type of image, i.e. of the flanking images, at the same time interval from the test time. Such a recording symmetry simplifies the averaging according to the invention. It is however also possible to apply asymmetric chronological recording patterns, and this can then be compensated for, if necessary, by a correspondingly modified mean value calculation.

As already stated above, two fundamental variants of the method are conceivable. In a first method variant, the image recorded at the time of testing is an inherent pattern image. This necessarily means that the flanking images are projection pattern images. In a second method variant, the conditions are reversed. Here, the image recorded at the test time is a projection pattern image. The flanking images are then necessarily inherent images. The resulting consequences for the assigned representations were already discussed above.

Advantageously it is provided that for calculating every planar displacement vector field, i.e. every 2D deformation, of the test object the respective inherent pattern image is compared with an inherent pattern image of the test object that is recorded at a reference time. This can be a static reference time but also a "variable" reference time. The latter is particularly suitable with repetitive methods in which the 3-D deformation pursuant to the inventive method is determined at several consecutive times, in each case relative to a preceding time of measurement.

Irrespective of the actual selection of the reference time it was found to be advantageous, if the comparison is done as a two-dimensional cross-correlation calculation of the inherent pattern images to be compared, which is applied to a plurality of image segments. For this purpose, the inherent pattern images to be compared with one another are broken up into uniform, defined windows and the respectively corresponding windows are correlated with one another by means of a two-dimensional cross-correlation calculation. In particular, the calculation method that is known to a person skilled in the art as DIC (Digital Image Correlation) can be used. A planar displacement vector field results, which assigns a two-dimensional displacement vector to each of the windows. By selecting the window size, it is possible to vary the resolution of the planar vector field and adapt it to the requirements of the individual case. A person skilled in the art knows of multiple alternatives. It is possible, for example, to use the methods known as "optical flow" or "least square matching" instead of the DIC. All methods can be performed as local variants, i.e. as described above, by disassembling the images into local interrogation windows, or into global variants that are in each case simultaneously applied to the entire image.

It is further preferably provided that the determination of the spatial displacement vector field, i.e. the 3-D deformation of the test object, is based on the calculated or estimated planar displacement vector field, i.e. the 2-D deformation of the test object at the time of testing, and correspondingly on the estimated or calculated shape of the test object at the time of testing, compared to a shape of the test object that is representative for the reference time. As already mentioned above, for the determination of the 3-D deformation not only the absolute shape of the test object at the time of testing, but in particular a change in shape realized at this time compared to a reference shape can be decisive. The reference shape can be an abstract target shape or the shape of the actual test object at a defined reference time. In the latter case, the same applies analogously for the shape reference time, as was discussed above in the context of the 2-D deformation reference time. Advantageously the reference times are selected identically for the 2-D deformation and the shape.

In particular in the case of the repetitive determination of the 3-D deformation, when the data of a preceding measurement are used as reference values for the actual measurement, i.e. if no images of both types of image are available for the exact reference time, it can be advantageous if the shape of the test object representative for the reference time is calculated or estimated from one or more projection pattern images recorded in close temporal proximity to the reference time. Therefore, as the reference shape, either the shape can be used that results from a projection pattern image recorded in close temporal proximity to the actual reference time, or, as the reference shape the shape can be used that results from an averaging estimation according to the invention within the framework of the preceding measurement which measurement serves here as a reference.

The first mentioned variant is particularly suitable if the test object is not subjected to mechanical stress between the two reference times.

Further features and advantages of the invention result from the following specific description and the drawings.

DETAILED DESCRIPTION

Identical reference symbols in the figures indicate identical or similar elements.

Figure 1:
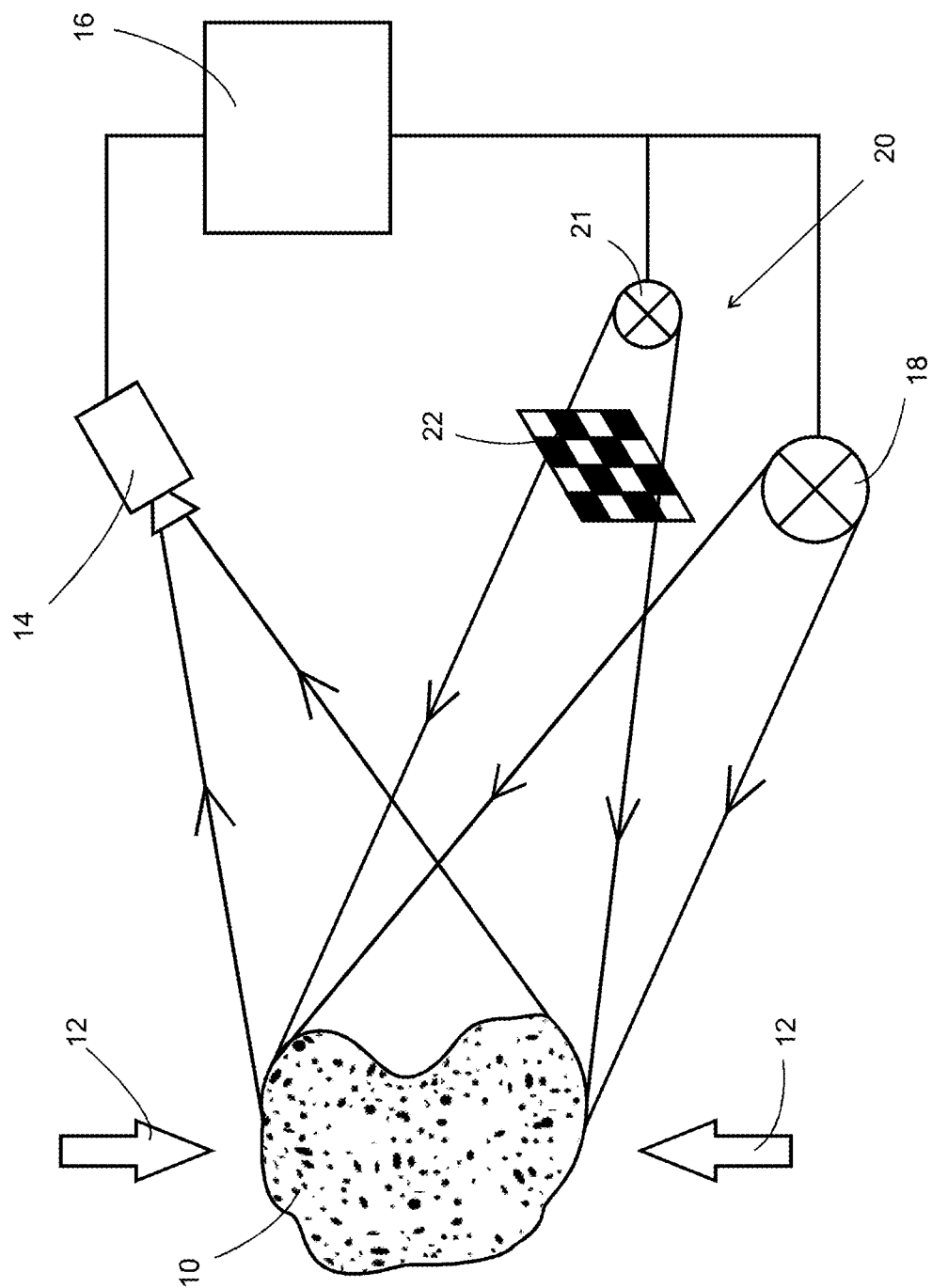
FIG. 1 a rough schematic illustration of a measuring arrangement for performing the method according to the present invention.

FIG. 1 illustrates a rough schematic view of the basic arrangement for a measuring station for performing the method according to the present invention. The object of the measurement is to determine the 3-D deformation of a test object 10 that is subjected to mechanical stress, as symbolized by load application arrows 12, in an apparatus which is not further illustrated in detail. The test object 10 is monitored by means of an image detector 14 that is connected to a control unit 16 from which it receives control commands, on the one hand, and to which on the other hand it provides its recorded image data for further processing. In the embodiments shown, the illumination required for recording the image of the test object 10 originates from two illuminating systems 18, 20, which are also connected to the control unit 16 from which they receive their control commands.

The first illuminating system 18 supplies an essentially uniform light, which is for example LED-based or laser-based. If the test object 10 is exclusively illuminated by means of the first illuminating system 18, the image detector 14 records so-called inherent pattern images, on which a small-scale inherent pattern structure of the surface of the test object 10 can be perceived. This inherent pattern structure can result because of properties of the object surface itself, for example its roughness, grain boundaries, or natural spotting; however, it can also be artificially applied, for example by spraying with an ink mist, or as a speckle pattern in the case of a laser-based first illuminating system 18.

The second illuminating system 20 comprises an actual light source 21 and a projection pattern screen 22, which, compared to the inherent pattern, has a large-scale periodic projection pattern in the form of a planar arrangement of areas of higher and lower transparency for the light of the light source 21. But it has been shown that neither the periodicity nor the large size of the projection pattern is absolutely necessary. Small-scale and non-periodic projection patterns can also be used as long as just the details are known. During illumination of the test object 10 using the second illuminating system 20, the projection pattern of the projection pattern screen 22 is projected onto the surface of the test object 10 and in this way is distorted according to the three-dimensional shape of the test object. Using the image detector 14 to record the test object 10 illuminated by means of the second illuminating system 20 provides a projection pattern image. The concept of projecting or of the projector in the context of the invention—not only in the context of the exemplary embodiments discussed here—is to be interpreted broadly and includes classic projectors, which project a rigid mask onto the test object 10, as well as modern projectors, which by means of their multi-mirror-arrays (MMA) permit almost any arbitrarily programmable and variable selection of patterns. The latter variant has the advantage that the apparatuses of the two illuminating systems 18, 20 can be combined, in that a switchover between inherent patent illumination and projection pattern illumination is done merely by reprogramming the MMA.

Calculation methods for determining the shape or change in shape of the test object from one or multiple projection pattern images are just as known to a person skilled in the art as are calculation methods for determining the 2-D deformation from multiple inherent pattern images. The latter will be subsumed here under the acronym DIC, without this implying any limitation to one specific calculation method. Calculation methods for determining a 3-D deformation of the test object 10 from the 2-D deformation determined from inherent pattern images and from the shape or shape change determined from projection pattern images, are also known to a person skilled in the art. For this reason, the computational details will not be further addressed here.

A person skilled in the art will understand that the schematic apparatus pursuant to FIG. 1 is to be understood purely as an example and not as a limitation of the invention. In particular, also, multiple image detectors 14 can be provided, in particular with different observation angles to the test object 10. The first and second illuminating system 18, 20 can also be combined in one single illuminating system or alternatively a plurality of such illuminating systems can be provided. Obviously, it is also not absolutely necessary to use a special apparatus to subject the test object 10 to defined mechanical stress. Even thermally or otherwise induced deformations are easily accessible to the measuring procedure according to the present invention.

Figure 2:
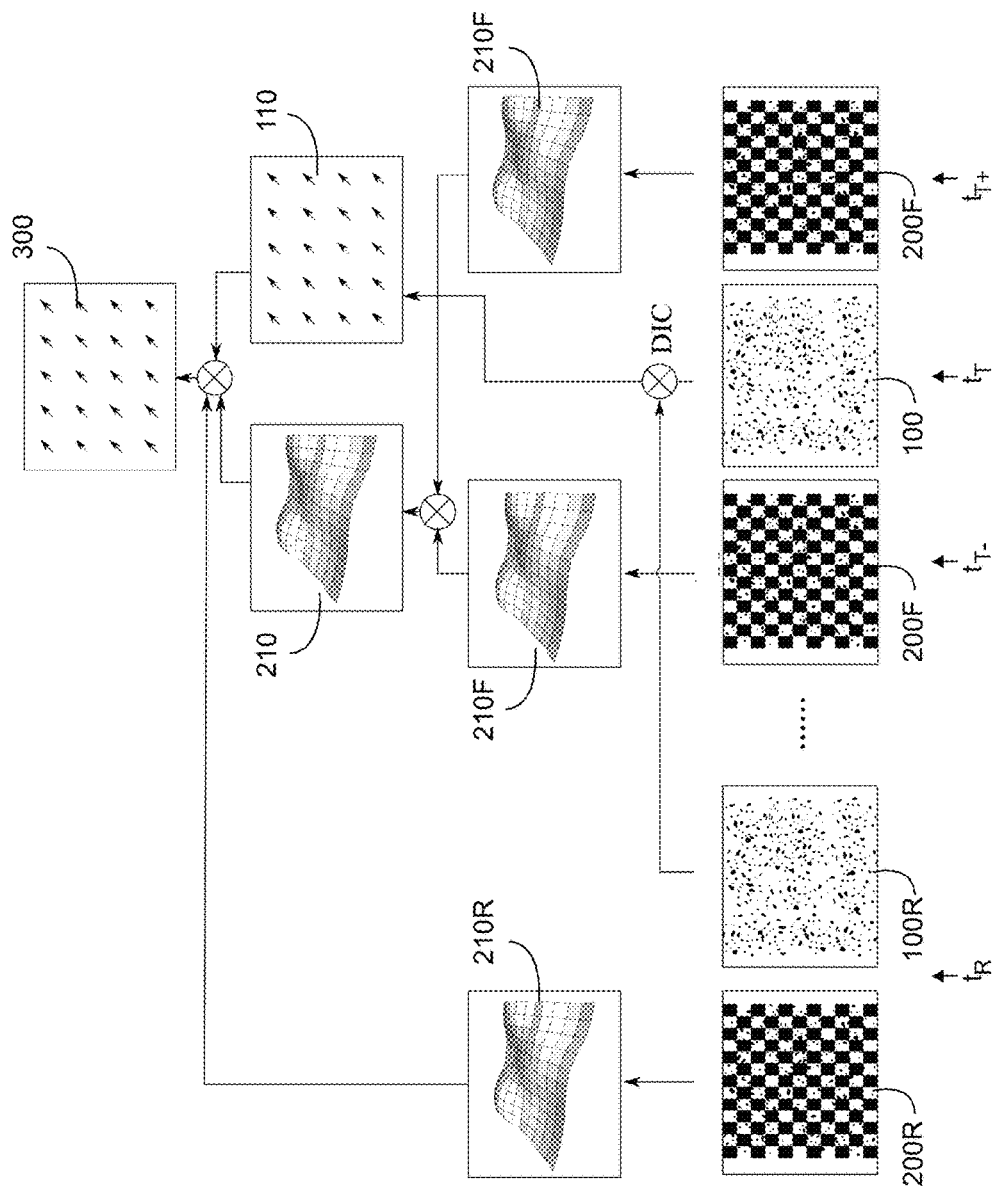
FIG. 2 an illustration of a first embodiment of the method according to the present invention.

FIG. 2 shows a preferred embodiment of the method according to the invention. An inherent pattern image 100 is recorded at a test time tT. Using DIC, this is then compared with a referential inherent image 100 R measured at a previous reference time tR to yield a planar displacement vector field 110, i.e the 2D-deformation that is representative of the test time tT.

At the time tT− situated temporally ahead of and to the left of the test time tT, and at the time tT+ situated temporally after and to the right of the test time tT, in each case a flanking projection pattern image 200F is recorded. From each of the flanking projection pattern images 200F the representative shape 210F (flanking shape) of the test object is calculated for the corresponding recording time tT− or tT+. Then, by means of averaging, the representative shape 210 for the test time tT is estimated from the two flanking shapes 210F. In a final procedural step the representative calculated 2D-deformation 110 for the test time tT, and the representative estimated shape 210 for the same test time tT, are mathematically combined to give the sought-after 3D-deformation, i.e. the sought-after spatial displacement vector field 300. For this purpose, as indicated in FIG. 2, typically also the shape 210R of the test object 10, which is representative for the reference time tR, is also included. In the embodiment depicted in FIG. 2 the reference shape 210R is the result of a shape calculation based on a referential projection pattern image 200R which was recorded at the reference time tR. However, the reference shape 210R can also be a shape that is estimated analogously to the foregoing explanation, or it can be a shape that is statically stored in the control system 16. A variant is also, of course, conceivable in which the reference shape 210R is the result of a shape calculation based on a projection pattern image that was recorded at a time temporally offset to the reference time tR. This variant can be considered in particular when the test object 10 is not exposed to any significant mechanical stress between the recordings of the referential inherent pattern image 100R and the recording time of the referential projection pattern image 200 R.

Figure 3:
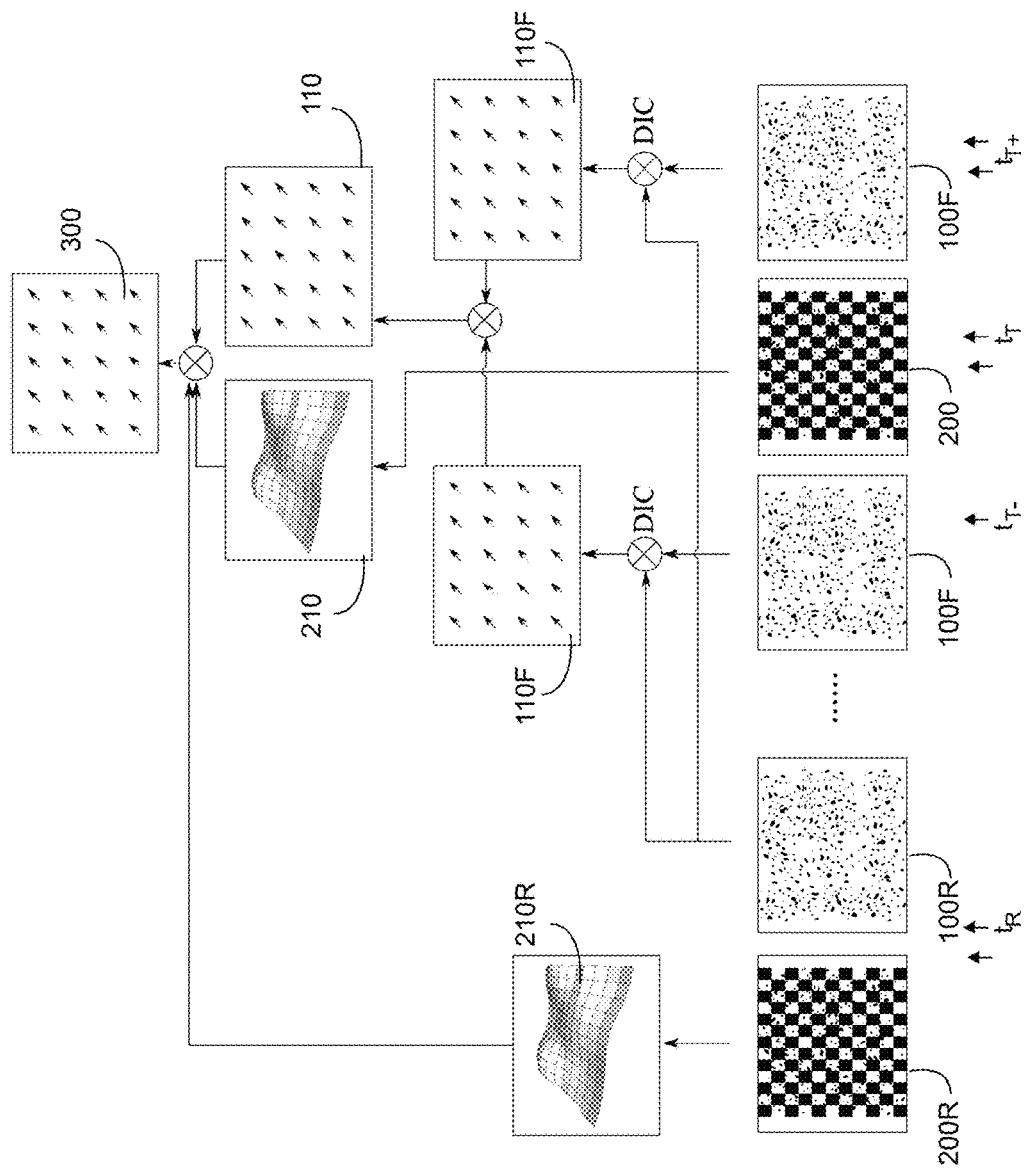
FIG. 3 an illustration of a second embodiment of the method according to the present invention.

FIG. 3 depicts a variant of a method according to the invention which differs substantially from the variant depicted in Figure in that at the test time tT a projection pattern image 200 is recorded and, at the flanking times tT− and tT+, in each case a flanking inherent pattern image 100F is recorded. The result of this is that the shape of the test object 10 on which the 3D deformation calculation is based and which is representative for the test time tT, is calculated directly from the projection pattern image 200. On the other hand, the 2D deformation 110 on which the 3D deformation calculation is based and which is representative for the test time tT is estimated, namely by averaging from two flanking 2D deformations 110F which are obtained in each case by DIC from the flanking inherent pattern images 100F and from the referential inherent pattern image 100R recorded at the reference time tR. In other respects, full reference can be made to what was said above with regard to FIG. 2.

The embodiments discussed in the specific description and shown in the figures obviously represent merely illustrative embodiments of the present invention. In the light of the present disclosure a person skilled in the art has a broad spectrum of optional variations available.

LIST OF REFERENCE NUMBERS

10 Test object
12 Load application arrow
14 Image detector
16 Control unit
18 First illuminating system
20 Second illuminating system
21 Light source of 20
22 Projection pattern screen of 20
100 Inherent pattern image
100F Flanking pattern image
100R Referential inherent pattern image
110 2D deformation/planar displacement vector field
110F Flanking 2D deformation/planar displacement vector field
200 Projection pattern image
200F Flanking projection pattern image
200R Referential projection pattern image
210 Shape
210F Flanking shape
210R Reference shape
300 3D deformation/planar displacement vector field
$t_T$ Test time
$t_{T-}$, $t_{T+}$ Flanking recording times
$t_R$ Reference time

The invention claimed is:
1. A method for determining a spatial displacement vector field (300) of a test object, (10), comprising:
   recording at least one inherent pattern image (100, 100F) while the test object (10) is illuminated with uniform illumination light,
   recording at least one projection pattern image (200, 200F) while the test object (10) is illuminated with a spatially modulated projection pattern projected onto said test object, calculating a planar displacement vector field (110, 110F) of the test object (10) from the inherent pattern image (100, 100F) when the inherent pattern image (110, 110F) is recorded as a representation of the test object (10) assigned to the inherent pattern image (100, 100F) and calculating a shape (210, 210F) of the test object from the projection pattern image (200, 200F) when the projection pattern image (200, 200F) is recorded as a representation of the test object (10) assigned to the projection pattern image (200, 200F), recording an image (100; 200) of a first of the two types of images at a test time ($t_T$) and recording images (100F; 200F) of a second of the two types of images at two recording times ($t_{T-}$; $t_{T+}$) temporally spaced before and after the test time ($t_T$), estimating the corresponding representation of the test object (10) at the test time ($t_T$) by averaging from the calculated representations of the test object (10) assigned to the images (100F; 200F) of the second type of image, and determining the spatial displacement vector field (300) based on the calculated representation of the test object (10) assigned to the image (100, 200) of the first type of image as well as on the representation of the test object estimated from the images (100F; 200F) of the second type of image.

2. The method of claim 1, wherein
the recording times ($t_{T-}$; $t_{T+}$) of the images (100F; 200F) of the second type of image are temporally equidistant from the test time ($t_T$).

3. The method of claim 1, wherein
the image recorded at the test time ($t_T$) is an inherent pattern image (100).

4. The method of claim 1, wherein
the image recorded at the test time ($t_T$) is a projection pattern image (200).

5. The method of claim 1, wherein
for calculating every planar displacement vector field (110; 110F) of the test object (10) the respective inherent pattern image (100; 100F) is compared with an inherent pattern image (100R) of the test object (10) recorded at a reference time ($t_R$).

6. The method of claim 5, wherein
the comparison is carried out as a two-dimensional cross-correlation calculation of the inherent pattern images (100, 100R; 100F, 100R) which are to be compared and it is applied to a plurality of image segments.

7. The method of claim 5, wherein
the determination of the spatial displacement vector field (300) of the test object (10) is based on the calculated or estimated planar displacement vector field (110) of the test object (10) at test time ($t_T$) and correspondingly on the estimated or calculated shape (210) of the test object (10) at the test time ($t_T$) compared to a representative shape (210R) of the test object (10).

8. The method of claim 7, wherein
the shape (210R) of the test object (10) representative for the reference time ($t_R$) is calculated or estimated from one or more projection pattern images (200R) recorded in close temporal proximity to the reference time ($t_R$).

9. The method of claim 1, of
the projection pattern is produced by a programmable multi-mirror-array.

\* \* \* \* \*